2,865,130

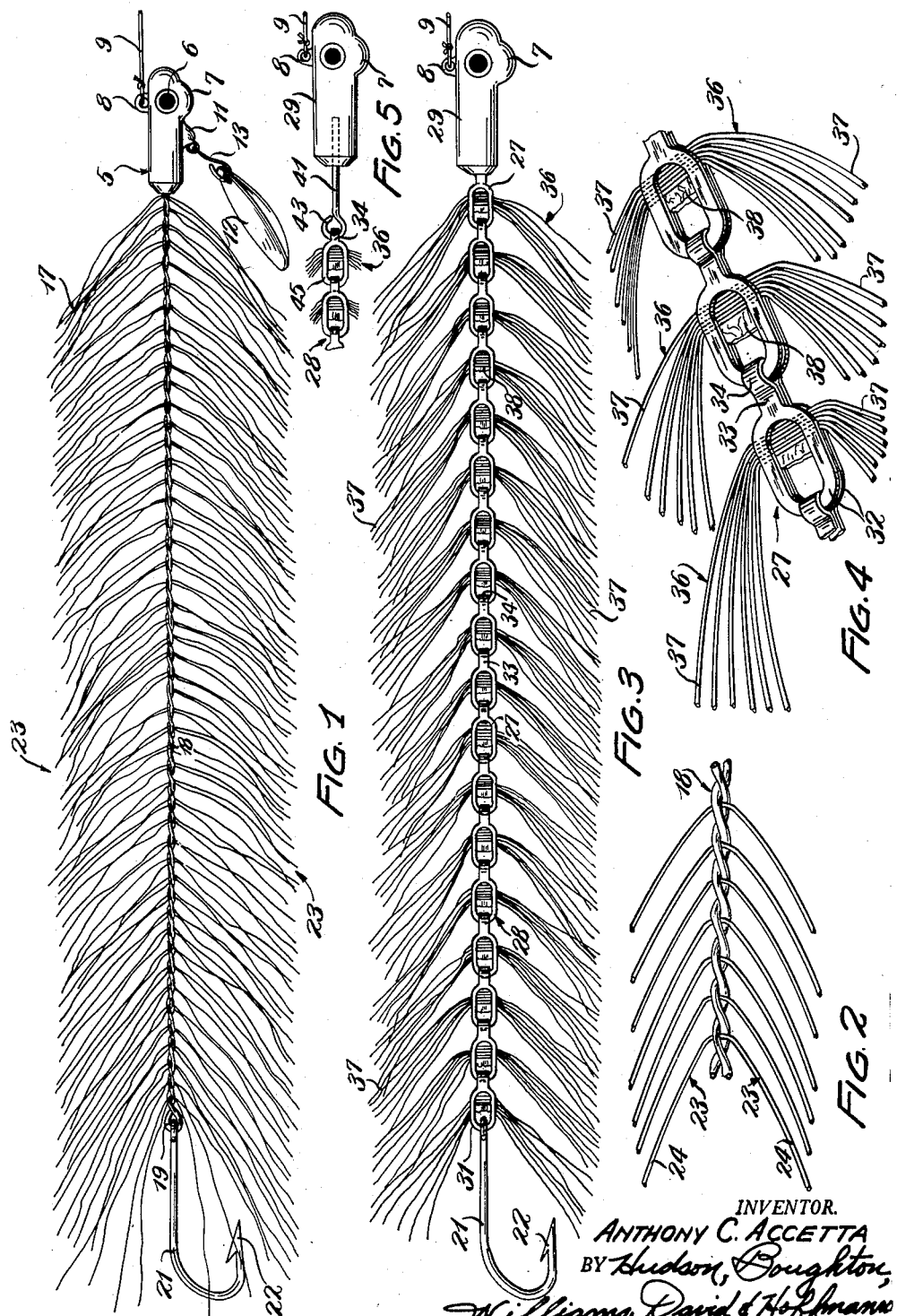

FISHING LURE

Anthony C. Accetta, Riviera Beach, Fla.

Application January 4, 1957, Serial No. 632,443

8 Claims. (Cl. 43—42.15)

This invention relates to a fish lure and more particularly to a fish lure especially adapted for trolling or casting.

An object of the present invention is the provision of a novel and improved fish lure which when drawn through the water closely simulates marine life, such as a sea worm or eel.

Another object of the present invention is to provide a novel and improved fish lure of a unitary structure, one that is relatively simple in construction and economical in cost of manufacture.

Other objects and advantages of the present invention will be realized by those versed in the art by reference to the following description of several embodiments illustrated in the accompanying drawings and forming part of this specification wherein, Fig. 1 is an elevational view of a fish lure embodying the present invention;

Fig. 2 is an enlarged fragmentary elevational view of a part of the body of the lure of Fig. 1 and shows in more detail the configuration and construction thereof;

Fig. 3 is a view similar to Fig. 1 but illustrates another form of the fish lure;

Fig. 4 is an enlarged fragmentary perspective view of a part of the body of the lure of Fig. 3 and shows in more detail the configuration and construction thereof; and Fig. 5 is a view similar to Fig. 3 but illustrates another way of attaching the body of the fish lure to its head.

Referring now to the drawings, wherein like elements are designated by the same reference character, the fish lure of Figs. 1 and 2 comprises a substantially cylindrical head 5 formed of any suitable heavy material such as lead which functions as a sinker and also provides adequate weight to the lure for casting. Said head is provided slightly rearwardly of its front end with diametrically opposed circular portions 6, only one being shown, which are preferably colored to simulate the eyes of a sea worm or eel. A keel-like portion 7 is also formed on the underside of the forward end of the head and properly positions the latter in the water. A closed eye 8 mounted on the head at a position substantially opposite to that of the keel-like portion 7 provides for the attachment of the conventional fishing line 9. A knob-like member or boss 11 is also formed on the underside of the head substantially intermediate its ends and to which a disk-shaped member or spoon 12, as known in the art, is swingably attached by means of link 13. The spoon 12 acts to turbulate the water in front of the body portion, to be presently described, as the fish lure is drawn through the water to give the appearance that said body is moving sinuously and also to simulate fin-like movement. Of course in some instances the spoon 12 may be omitted if desired.

The fish lure of the present form also includes a body 17 comprising a predetermined length of flexible material preferably formed of a single length of metallic wire, although other suitable materials may also be utilized. As shown in Fig. 1, said wire is bent up and over upon itself to form a pair of substantially equal strands which are then wrapped or twisted together in a helical fashion to provide an elongated spine-like member 18. An eye 19 is thereby formed at the closed or bight end of said spine-like member and is adapted to receive a suitable fish hook 21, which is normally pulled behind said member 18 with its barbed end 22 pointed toward the head 5 in a position so as to impale or snag a fish attacking the lure. The opposite end of said member 18 is rigidly anchored centrally within the tail portion of the head 5.

A plurality of freely flexible fibrous thread-like members 23, formed of nylon, silk or any other suitable natural or synthetic fibers are attached to the body 17 of the lure, and as shown more clearly in Fig. 2, said thread-like members 23 are inserted in between the wrapped strands of the spine-like member 18 at longitudinally spaced points therealong, preferably at the end of each complete twist thereof, so that the longitudinal center of each member 23 is firmly pinched and held therein. The ends 24 of each of said members 23 are thereby free to move independently about their anchored center portion, and as the lure is drawn through the water they will trail their respective center portion and lie against or adjacent to the spine-like member 18, substantially surrounding the latter to realistically simulate the body of a sea worm or eel or other marine life. Said ends may also wiggle slightly which, in conjunction with the appearance of sinuous movement of the spine-like member 18, simulate living marine life. The thread-like members are also preferably brightly colored so as to attract passing fish in the water.

In forming the embodiment of fish lure of Figs. 1 and 2 the body 17 is preferably assembled as an integral unit and is then securely anchored to the head during the fabrication thereof. One manner of fabricating the head that is readily adaptable to the complete assemblage of the fish lure is by die casting or molding whereby the end of the body 17 opposite to the hook attaching eye 19 is inserted into the die or mold and then the metal, forming the head, is poured therein and upon cooling securely anchors the body thereto.

The usual method of fabricating the body 17 is to thread a predetermined length of metallic wire through the connecting eye of a fish hook 21 until equal lengths of said wire extend outwardly on either side. Next, the equal lengths of wire are bent over so as to be longitudinally adjacent one another and are then twisted or wrapped about each other in substantially a helical fashion to form the elongated body 18 with a closed eye 19 on the hook-attaching end. At each end of one complete twist or wrap the desired number of thread-like members 23 are inserted between said lengths of wire such that equal end portions extend on either side. In the illustrated form of fish lure only one thread-like member is shown for simplification. The twist or wrap is then progressively continued whereby the thread-like member or members are securely fastened in place. The open end of the body is then secured to the head in the manner previously described.

In the form of lure of Figs. 3 and 4 the body comprises a plurality of interconnected links 27 forming a freely flexible chain 28, one end of which is anchored to the head 29 of the lure in a manner similar to that previously described. The end link 31 on the opposite end of the chain 28 is adapted to receive the eye of the fish hook 21. As is shown in Fig. 3, the spoon 12 is not utilized in the present form of lure since, under normal conditions, the movement of the freely flexible chain 28 is substantially sinuous as the lure is drawn through the water. However, it is contemplated that said spoon 12 may be attached to the head 29 in a manner as is shown in the previous form to give a more realistic appearance of sinuous movement to the body.

As shown in Fig. 4, each link 27 of the flexible chain 28 comprises a pair of oval-shaped members 32 integrally formed on one end with an outwardly extending arm 33 having a substantially circular connecting portion 34 encircling the next adjacent link. A group of freely flexible fibrous thread-like members 36, being similar in form to the thread-like members 23 of the previous embodiment, are extended between the oval-shaped members 32 of each of the links 27 so as to have equal end portions 37 thereof extending outwardly on either side. Said groups of members 36 are thereby spaced longitudinally along the flexible chain 28. The center portion of said thread-like members 36 may be secured to the chain 28 by any suitable means and in the present form a quantity of suitable adhesive, plastic cement or glue are utilized as indicated at 38. The ends 37 of said thread-like members are thereby independently free to move, and as the lure is drawn through the water they will trail their respective anchored center portion and surround the flexible chain 28 whereby, due to its sinuous-like movement, will simulate the live body of a sea worm or eel. The ends 37 of said members 36 may also wiggle slightly to further simulate living marine life.

Fig. 5 illustrates another method of attaching the flexible chain 28 to the head 29 of the fish lure, wherein a connector comprises a stem 41, which has its one end anchored centrally to the tail portion of the head in a manner as previously described and extends rearwardly therefrom. The rearward end of the stem is provided with an eye 43 which receives the circular connecting portion 34 on the end link 45 of the chain. The eye 43 may be originally formed slightly open and upon receiving the connecting portion 34 may be closed, as is shown in Fig. 5, to securely fasten the end link 45 of the chain thereto.

From the foregoing description of several preferred forms of fish lure embodying the invention, it will readily be seen that an efficient and effective lure is provided and is relatively simple in construction. It will be further realized that the lure is freely flexible so that it simulates the sinuous movement of living marine life as it is drawn through the water. Also it will be appreciated that the head of the lure provides sufficient weight to enable the lure to be cast by the fisherman and additionally functions as a sinker to keep the lure submerged as it is drawn through the water.

Having thus described several embodiments of the present invention it is understood that the invention is susceptible of various modifications and adaptations that are within the scope of the claims herein.

Having thus described my invention, I claim:

1. A fish lure comprising a head, a body attached to one end of said head and including an elongated freely flexible member having means on the end opposite to said head for receiving a fish hook, a plurality of freely flexible thread-like members spaced longitudinally along said elongated member and having the center portions thereof extending through and interlocked with said elongated member and providing free ends extending outwardly therefrom whereby each of said free ends is independently movable about its respective center portion.

2. A fish lure as defined in claim 1 and wherein the elongated freely flexible member comprises a plurality of interconnected links forming a chain.

3. A fish lure comprising a head, a body attached to one end of said head and including an elongated flexible member having a plurality of equal strand lengths of metallic wire, said strand lengths being twisted or wrapped about one another, and means on the end of the body opposite to said head for receiving a fish hook, a plurality of thread-like members spaced longitudinally along said elongated flexible member and inserted in-between said twisted strand lengths, the center portion of each of said thread-like members being fastened to said elongated member by said twisted strand lengths and providing free ends extending outwardly thereof whereby said free ends are independently flexible about their respective center portion.

4. A fish lure as defined in claim 3 and wherein at least one of said thread-like members is inserted in-between said strand lengths at the end of each complete twist or wrap.

5. A fish lure as defined in claim 4 and wherein the head mounts a closed eye for the attachment of a fishing line, a keel-like portion formed on said head substantially diametrically opposite to said closed eye, a boss formed adjacent to and rearwardly of said keel-like portion and a disk-shaped member swingably attached to said boss.

6. A fish lure comprising a head, means on said head for attaching a fishing line thereto, a keel-like portion formed on said head opposite to the attaching means, a body attached to one end of said head and including an elongated freely flexible member having means on the end opposite to said head for receiving a fish hook, a plurality of freely flexible thread-like members spaced longitudinally along said elongated member and having the center portions thereof extending through and interlocked with said elongated member and providing free ends extending outwardly thereof whereby each of said free ends is independently movable about its respective center portion.

7. A fish lure as defined in claim 6 and wherein a disk-shaped member is linkably attached to said head and is operative to simulate sinuous movement to said body.

8. A fish lure comprising a head, means on said head for attaching a fishing line, a body attached to one end of said head and including a plurality of interconnected links forming an elongated freely flexible chain, means on the end of the chain opposite to the head for receiving a fish hook, a plurality of freely flexible thread-like members spaced longitudinally along said chain with the center portions thereof extending through and interlocked with said links providing free ends extending outwardly thereof which are independently movable relative to their respective center portion.

References Cited in the file of this patent

UNITED STATES PATENTS

| | | |
|---|---|---|
| D. 158,537 | Accetta | May 16, 1950 |
| 582,677 | Parker | May 18, 1897 |
| 877,324 | Gilbert | Jan. 21, 1908 |
| 1,870,767 | Brown | Aug. 9, 1932 |
| 2,148,799 | Bilinski | Feb. 28, 1939 |
| 2,533,523 | Sivey et al. | Dec. 12, 1950 |
| 2,563,522 | Fisher | Aug. 7, 1951 |
| 2,722,766 | Accetta | Nov. 8, 1955 |